No. 660,875. Patented Oct. 30, 1900.
J. & G. WAMBACH.
BICYCLE GUARD.
(Application filed July 28, 1900.)
(No Model.)
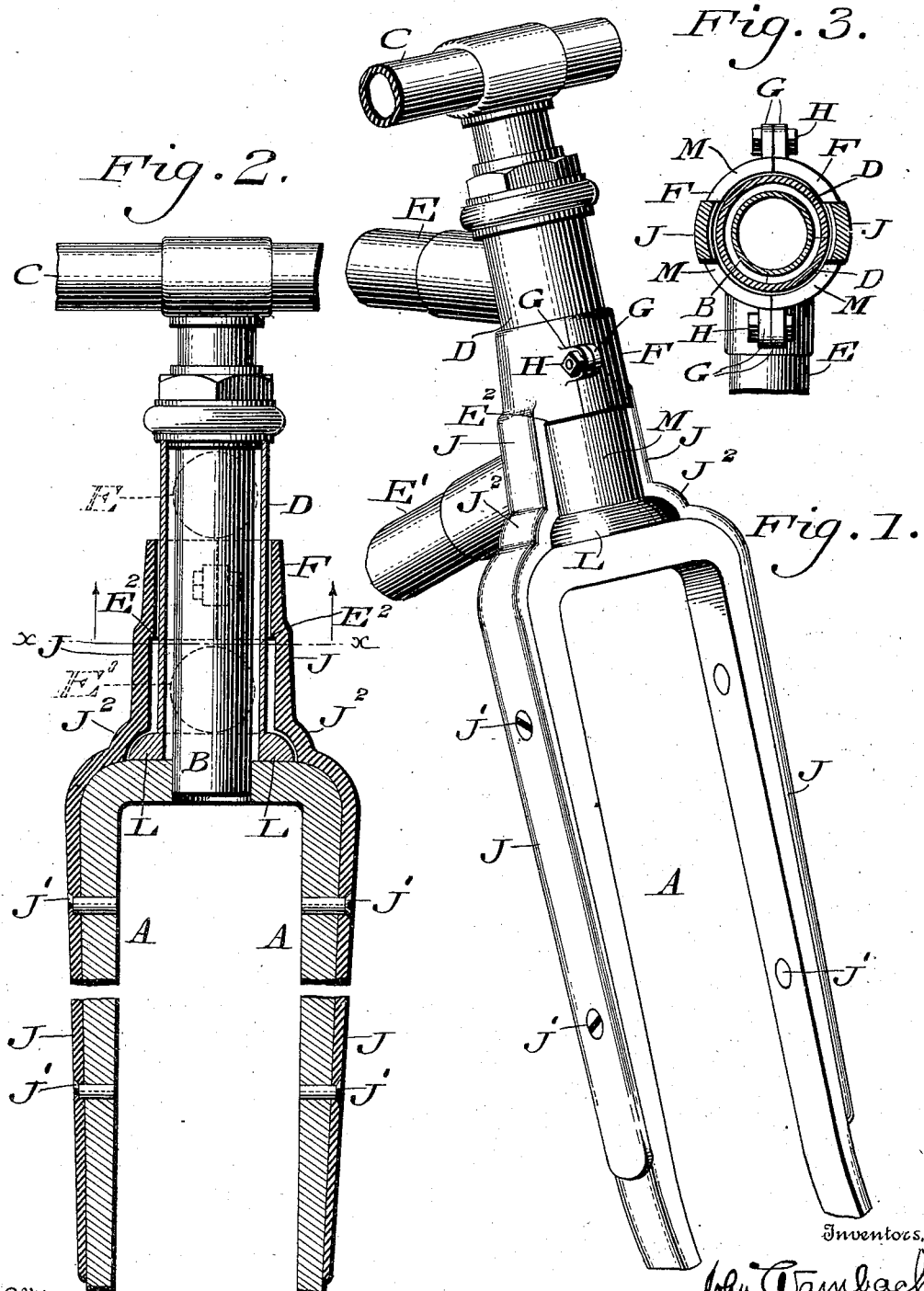
Witnesses
P. F. Eagle
L. Douville
Inventors
John Wambach
George Wambach
By Giedersheim & Fairbanks
Attorneys

UNITED STATES PATENT OFFICE.

JOHN WAMBACH AND GEORGE WAMBACH, OF PHILADELPHIA, PENNSYLVANIA.

BICYCLE-GUARD.

SPECIFICATION forming part of Letters Patent No. 660,875, dated October 30, 1900.

Application filed July 28, 1900. Serial No. 25,100. (No model.)

*To all whom it may concern:*

Be it known that we, JOHN WAMBACH and GEORGE WAMBACH, citizens of the United States, residing in the city and county of Philadelphia, State of Pennsylvania, have invented a new and useful Improvement in Bicycle-Guards, which improvement is fully set forth in the following specification and accompanying drawings.

Our invention consists of a device attachable to the forks of a bicycle-wheel as supplemental to the connection of the steering-stem with said forks for the purpose of preventing the separation of the forks from the sleeve or post around said stem in the event of the breakage of the latter, whereby the forks remain connected with said sleeve, and accordingly prevent running away of the wheel.

Figure 1 represents a perspective view of a bicycle-guard embodying our invention. Fig. 2 represents a vertical section thereof. Fig. 3 represents a section on line $x\ x$, Fig. 2.

Similar letters of reference indicate corresponding parts in the figures.

Referring to the drawings, A designates the forks of the front or steering wheel of a bicycle, B the steering-stem, which is connected with said forks and with the handles C, and D the sleeve or post around said rod, the members E E' of the frame being connected with said sleeve.

F designates a divided or split collar which is adapted to freely embrace the sleeve D and provided with ears G to receive the screws or bolts H for coupling the sections of the collar on said sleeve. Depending from said collar are the hangers or legs H, which are secured to the forks A by screws J' or other suitable means and have shoulders $J^2$ on their upper side portions.

It will be seen that in the event of the breakage of the connection of the forks and steering-stem—a common occurrence in bicycles—the collar F remains on the sleeve D, and as the legs J connect said collar with the forks the wheel of the bicycle will not run away, but, on the contrary, remain on the bicycle, preventing accidents or injury to the rider, while the bicycle may be steered sufficiently for all purposes until the bicycle is repaired, it being noticed that the wheel may be thrown angularly forward to a slight extent; but here the lower edges of the sections of the collar F form shoulders $E^2$, the rear ones of which rest on the upper member E of the frame, while the side shoulders $J^2$ rest on the cup L on the lower end of the sleeve, so that said rear and side shoulders ride on said member and cup, while if the bicycle is raised or carried the guard cannot slip down off from said sleeve, and thus the wheel will not be disengaged. The portions of the hangers below the collar are narrow, so as to leave the spaces M, whereby the adjacent portion of the member E of the frame will not interfere with the same as the guard rotates with the wheel in the proper steering motions thereof.

Having thus described our invention, what we claim as new, and desire to secure by Letters Patent, is—

1. A bicycle-guard for the purpose described consisting of a collar and legs pendent therefrom, said collar being adapted to freely embrace the sleeve or post of the steering-stem of the bicycle, and said legs being adapted to be firmly connected with the forks of the steering-wheel of the bicycle.

2. A divided collar, means for coupling the same and legs pendent from the sections of said collar and being attachable to the forks of the steering-wheel of a bicycle, said collar freely embracing the sleeve or post of the steering-rod of the bicycle as a supplemental connection for the forks with said sleeve.

3. The combination with the steering-stem of a bicycle and the sleeve or post around the same, of a supplemental guard or connection composed of a collar freely encircling said sleeve, and legs pendent from said collar adapted to be connected with the forks of the steering-wheel of the bicycle, said stem being secured to said forks, said guard and said sleeve having means for preventing the disconnection of the guard from said sleeve, and providing auxiliary bearings for the guard.

JOHN WAMBACH.
GEORGE WAMBACH.

Witnesses:
GEORGE J. VOGT,
MARK JACOBY.